(12) United States Patent
Roivainen (10) Patent No.: US 10,071,883 B2
(45) Date of Patent: Sep. 11, 2018

(54) HOISTING MACHINE WITH VIBRATING DAMPING AND AN ELEVATOR ASSEMBLY

(71) Applicant: KONE Corporation, Helsinki (FI)

(72) Inventor: Gabriela Roivainen, Hyvinkää (FI)

(73) Assignee: KONE CORPORATION, Helsinki (FI)

( * ) Notice: Subject to any disclaimer, the term of this patent is extended or adjusted under 35 U.S.C. 154(b) by 997 days.

(21) Appl. No.: 14/518,954

(22) Filed: Oct. 20, 2014

(65) Prior Publication Data

US 2015/0129364 A1    May 14, 2015

(30) Foreign Application Priority Data

Nov. 13, 2013  (EP) ..................................... 13192658

(51) Int. Cl.
| | |
|---|---|
| *B66B 7/04* | (2006.01) |
| *B66B 11/04* | (2006.01) |
| *H02K 5/24* | (2006.01) |
| *H02K 21/24* | (2006.01) |
| *H02K 7/10* | (2006.01) |
| *H02K 7/102* | (2006.01) |

(52) U.S. Cl.
CPC .......... *B66B 7/048* (2013.01); *B66B 11/0438* (2013.01); *H02K 5/24* (2013.01); *H02K 7/102* (2013.01); *H02K 7/1008* (2013.01); *H02K 21/24* (2013.01)

(58) Field of Classification Search
CPC .......... H02K 5/24; H02K 1/06; H02K 7/1008; B66B 11/008; B66B 11/0045; B66B 15/08
See application file for complete search history.

(56) References Cited

U.S. PATENT DOCUMENTS

| | | | | |
|---|---|---|---|---|
| 5,899,301 A | * | 5/1999 | Aulanko ............. | B66B 11/0438 187/254 |
| 5,982,060 A | * | 11/1999 | Hakala ................ | B66B 11/0438 187/250 |
| 5,996,742 A | * | 12/1999 | Aulanko ............. | B66B 11/0438 187/254 |

(Continued)

FOREIGN PATENT DOCUMENTS

| | | |
|---|---|---|
| WO | WO 2010/063869 A1 | 6/2010 |
| WO | WO 2011/036348 A1 | 3/2011 |

(Continued)

OTHER PUBLICATIONS

NPL: EPO Search Report, EP 13192658, dated Aug. 4, 2014, pp. 1-6.

*Primary Examiner* — Michael A Riegelman
(74) *Attorney, Agent, or Firm* — Birch, Stewart, Kolasch & Birch, LLP (57) ABSTRACT

A hoisting machine includes an axial flux motor including a rotor having rope grooves and arranged in rotor compartment between a body part and a protection plate, and a stator arranged against the rotor in such a manner that the rotor is separated by the stator by an air gap. The hoisting machine further includes a first cover plate and a second cover plate, arranged at opposite sides of the hoisting machine, and both being equipped with a damper. The tightness between the first cover plate and the second cover plate is adjustable. An elevator assembly and method of damping vibration of a hoisting machine are also disclosed.

20 Claims, 5 Drawing Sheets

(56) References Cited

U.S. PATENT DOCUMENTS

| | | | | |
|---|---|---|---|---|
| 6,006,865 A | * | 12/1999 | Ammon | ............ B66B 11/0045 |
| | | | | 187/266 |
| 6,401,873 B1 | * | 6/2002 | Mustalahti | ............ B66B 7/027 |
| | | | | 187/292 |
| 2006/0231345 A1 | * | 10/2006 | Mustalahti | ............ B66L 37/10 |
| | | | | 187/266 |

FOREIGN PATENT DOCUMENTS

| WO | WO 2011/080390 A1 | 7/2011 |
|---|---|---|
| WO | WO 2011/154614 A1 | 12/2011 |

\* cited by examiner

HOISTING MACHINE WITH VIBRATING DAMPING AND AN ELEVATOR ASSEMBLY

FIELD OF THE INVENTION

The invention relates to design and construction of electric motors used in elevators.

BACKGROUND ART

The operation of a rotating electric machine, such as a synchronous and induction motor, is based on a magnetic field moving in a stator and rotor. This magnetic field is produced as a joint effect of stator and rotor magnetizations. The currents flowing in the stator windings produce in the air gap of the machine a rotating magnetic field, whose phase difference relative to the rotor magnetization creates a force effect in the direction of motion of the rotor. This force effect causes the rotor to rotate.

The rotor and stator magnetizations together also produce a force of attraction between stator and rotor. The attractive force is usually multiple times greater than the force causing the rotor to rotate. Since the attractive force appears in the zone where the magnetic field is transferred from rotor to stator and vice versa, the attraction vector rotates in accordance with the magnetic field. Therefore, local variations in the attractive force between stator and rotor may produce vibration in the electric machine.

Vibration of an electric machine often produces disturbing noise radiating into the environment, and, on the other hand, it may also shorten the service life of mechanical components of the electric machine. Vibration may also be transferred by transmission e.g. via the mounting interface to the environment, such as to the supporting structures surrounding the electric machine.

It is a general aim to utilize built space as efficiently as possible, for example, owing to space requirements. In the last decade, also the applicant has participated in the development of more compact hoisting machines of elevators. A compact hoisting machine of the applicant, and guide rail fixing arrangment for the same are disclosed in international patent application published under publication number WO 2011/154614 A1. Another compact elevator hoisting machine of the applicant has been disclosed in international patent application published under publication number WO 2011/036348 A1. Both hoisting machines comprise an axial flux motor.

Axial flux motors for hoisting machines are currently being designed to be as flat as possible in their dimensions in the direction of the axis of rotation or as small as possible in their dimensions in the direction of the radius, in which case the hoisting machines fit better in connection with, for instance, the wall part of the elevator hoistway or into some other narrow/shallow space.

However, the rigidity of the hoisting machine may form a problem e.g. when minimizing the length in the direction of the axis of rotation of a hoisting machine implemented with an axial flux motor. For example, rigidity is required of the hoisting machine of an elevator as well as of the support structure of the hoisting machine, because the hoisting machine must support the elevator mechanics suspended in the elevator hoistway. Also the noise level of the hoisting machine may increase to be disturbing when the rigidity of the hoisting machine weakens.

An arrangement for damping vibration in an electric machine, and a corresponding method, have been disclosed in international patent publication published under publication number WO 2010/063869 A1. In the arrangement, vibration dampers are fitted between the stator and the machine frame, or between the stator winding and machine frame.

OBJECTIVE OF THE INVENTION

Vibration damping and noise reduction remain challenges in the context of axial motors that are used in elevator hoisting machines. This follows partly from the fact that the suspension ropes are moved by the drive sheave having rope grooves, the drive sheave normally being integrated in the rotor, and therefore the rotor compartment has to be at least partly open to enable the movement of the ropes, partly from the cooling required for the motor brakes that usually need to directly engage the rotor or its shaft. It is clear that such an open rotor compartment is far from ideal from the design engineer's point of view who has the objective to reduce vibration and/or noise caused by the hoisting machine.

It is an objective of the invention to improve vibration damping of a hoisting machine and in an elevator assembly, and so to reduce noise and vibrations caused by the operation of the hoisting machine, at least over a frequency range.

This objective can be achieved according to the first aspect of the invention with a hoisting machine according to independent claim 1 and according to the second aspect of the invention with an elevator assembly according to independent claim 12, and with the improvement in vibration damping of a hoisting machine and in an elevator assembly according to independent claim 14.

The dependent claims describe further advantageous and inventive aspects of the hoisting machine and of the elevator assembly.

ADVANTAGES OF THE INVENTION

The hoisting machine according to the first aspect of the invention comprises an axial flux motor comprising a rotor having rope grooves arranged in rotor compartment between a body part and a protection plate, and a stator arranged against the rotor in such a manner that the rotor is separated by the stator by an air gap. The hoisting machine further comprises a first cover plate and a second cover plate that are arranged at opposide sides of the hoisting machine and both equipped with a damper. The tightness between the first cover plate and the second cover plate is adjustable. The cover plates with dampers and adjustable tightness help to suppress noise and form an efficient noise and vibration suppression arrangement. In this manner, the inventor has in simulations carried out by her been able to observe significant noise suppression over a frequency range.

The effect of the damper is that it tends to disperse any additional vibrations between the cover plates and the body part of the axial flux machine and the protection plate.

Advantageously, the first cover plate is located on the body part or in a recess in the body part, or the second cover plate is located on the protection plate or in a recess in the protection plate. Most advantageously, the first cover plate is located on the body part or in a recess in the body part, and the second cover plate is located on the protection plate or in a recess in the protection plate. The inventor has been able to make the unexpected observation that the body part and the protection plate of the axial flux motor are behaving like a loudspeaker. By arranging the first and/or second cover plates to the structure, the structure can be stiffened and the loudspeaker-like behaviour can be suppressed significantly over a frequency range.

Thanks to adjustable tightness, the frequency range over which the noise and vibration suppression is at strongest can be adjusted in such a manner that the desired frequency range is suppressed at most. This is very practical in the context of hoisting machines, since normally the acoustic system formed by the hoisting machine and its neighbouring elevator assembly parts, such as, guide rail, fixing arrangements, and wall parts, tends to have several different resonance frequencies. Since the attenuated frequency range can now be adjusted, the adjustment can be carried out in such a manner that the most disturbing frequency range of the acoustic system suppressed. Alternatively or in addition, with the adjustability it may become easier to suppress certain resonance frequencies in the acoustic system.

Preferably, the first cover plate and the second cover plate are interconnected through a tightness adjustion mechanism. This enables the use of the first and the second cover plate jointly to stiffen the structure of the axial flux motor. Then the tightness adjustion mechanism may penetrate the rotor and the stator. In this way, the tightness adjustion mechanism can be carried out in a manner that enables a compact size of the axial flux motor since otherwise the interconnection should be carried at least outside the rotor. In view of the limited space in the hoistway, making interconnection outside the rotor could easily increase the volume of the hoisting machine.

Preferably, the tightness adjustion mechanism is carried out by using at least one form-locking arrangement, preferably with a bolt and a nut. In this manner, the safety of testing, maintenance and using of the hoisting machine can be improved since the form-locking of the tightness adjustion mechanism reduces the risk of components of the tightness adjustion mechanism separating from the hoisting machine and falling in the hoistway.

Most preferably, the form-locking arrangement comprises a bolt and a nut. The bolt that has a bolt head, and the nut are so arranged that they are at opposite sides of respective cover plate than the dampers so that the dampers are tightenable or loosenable by rotating the bolt head and/or the nut. Most advantageously, the cover plates are easy to replace. The mass of the hoisting machine does not need to be increased signicicantly so that the cost of cast materials do not need to be increased.

Preferably, the first cover plate and the second cover plate are so configured that they form an external damper. This helps to avoid vibrations connecting from the body part of the axial flux motor and from the protection plate to the cover plates. Such connecting vibrations might increase vibrations and noise instead of suppressing them.

Most preferably, the first cover plate and the second cover plate that both serve as carrier for the respective damper are made of iron. Alternatively, they also may comprise iron. Iron is dense enough and so facilitates the passing of the acousting modes from the axial flux motor body part and protection plate to the noise and vibration suppression arrangement, and can therefore be used to efficiently suppress noise and vibrations.

Most advantageously, the damper is a layer of elastic material or comprises at least one layer of elastic material, such as but not limited to, rubber or elastomer.

Preferably, the hoisting machine further comprises at least one rail fixing arrangement for fixing the hoisting machine to a guide rail. The rail fixing arrangement can be integral to the axial flux motor body part. In this manner, the acoustic behaviour of the hoisting machine can be made better controllable.

The elevator assembly according to the second aspect of the invention comprises an elevator car that is movable in elevator hoistway by rotation of a hoisting machine causing movement of suspension ropes in rope grooves. The acoustic performance of the elevator assembly can in this manner be realized as adjustable in terms of the noise and vibration suppression frequency range.

Advantageously, the elevator assembly has a hoisting machine that comprises at least one rail fixing arrangement for fixing the hoisting machine to a guide rail, and the elevator car is movable along one, two or more guide rails in the elevator hoistway. The hoisting machine has been installed between between a wall part of the elevator hoistway and the guide rail in such a manner that suspension ropes of the elevator assembly are operable by the rotor via rope grooves in such a manner that the suspension ropes are located between the hoisting machine and the movable elevator car. The acoustic performance of the subsystem of the elevator assembly including the hoisting machine, the fixing arrangement and the guide rail can in this manner be realized as adjustable in terms of the noise and vibration suppression frequency range.

The improvement in vibration damping of a hoisting machine and in an elevator assembly is characterized by adjusting tightness between the first cover plate and the second cover plate of the hoisting machine according to the first aspect of the invention or any of its further aspects that is installed and/or operated in the elevator assembly according to the second aspect of the invention or any of its further aspects, to modify the operating noise caused by operation of the hoisting machine.

LIST OF DRAWINGS

In the following, the hoisting machine and the elevator assembly are described in more detail with reference to the exemplary embodiments shown in appended drawings in FIGS. 3 to 7. The efficiency of the improvement can be verified by simulation results shown in FIG. 8. Of the appended drawings.

Same reference numerals refer to same parts in all FIG.

DETAILED DESCRIPTION

The concept of vibration damping method according to the present invention and the hoisting machine according to the present invention, and in particular the vibration concept emploeyed in the vibration damping between the drive-sheave protection plate and mounting frame are explained in more details within the context of the elevator assembly disclosed in certain applicants prior applications, namely WO 2011/154614 A1, of which the structure of the elevator assembly, the operation mechanism of the hoisting machine and of the rotor, and the fixing arrangement and fixing points and optionally also its vibration damping, machinery brakes, brake drums and brake shoes;

WO 2011/036348 A1, of which the rotor stucture, in particular also including the rotor bearings; and optionally, also WO 2010/063869 A1, of which the details of the dampers arranged between the stator and the machine frame, or between the stator winding and machine frame are incorporated in the present application by reference.

Figure 1:
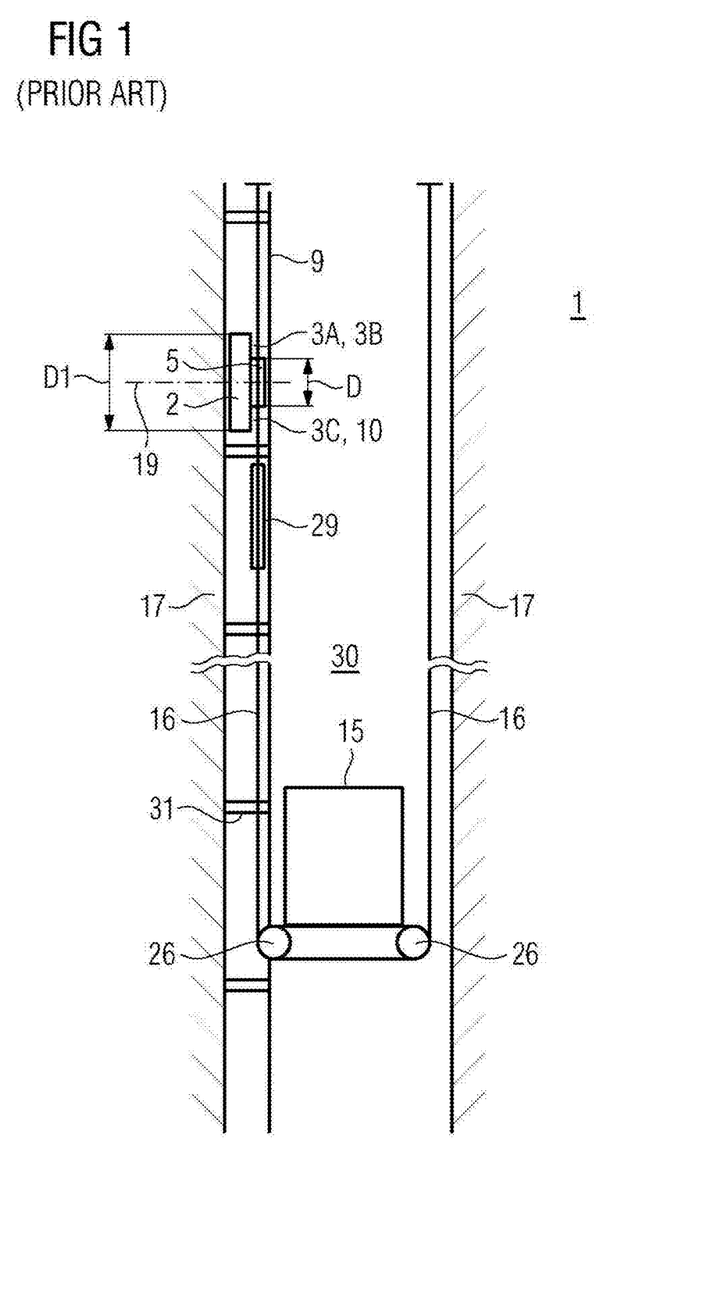
FIG. 1 illustrates an elevator assembly.
Figure 2:
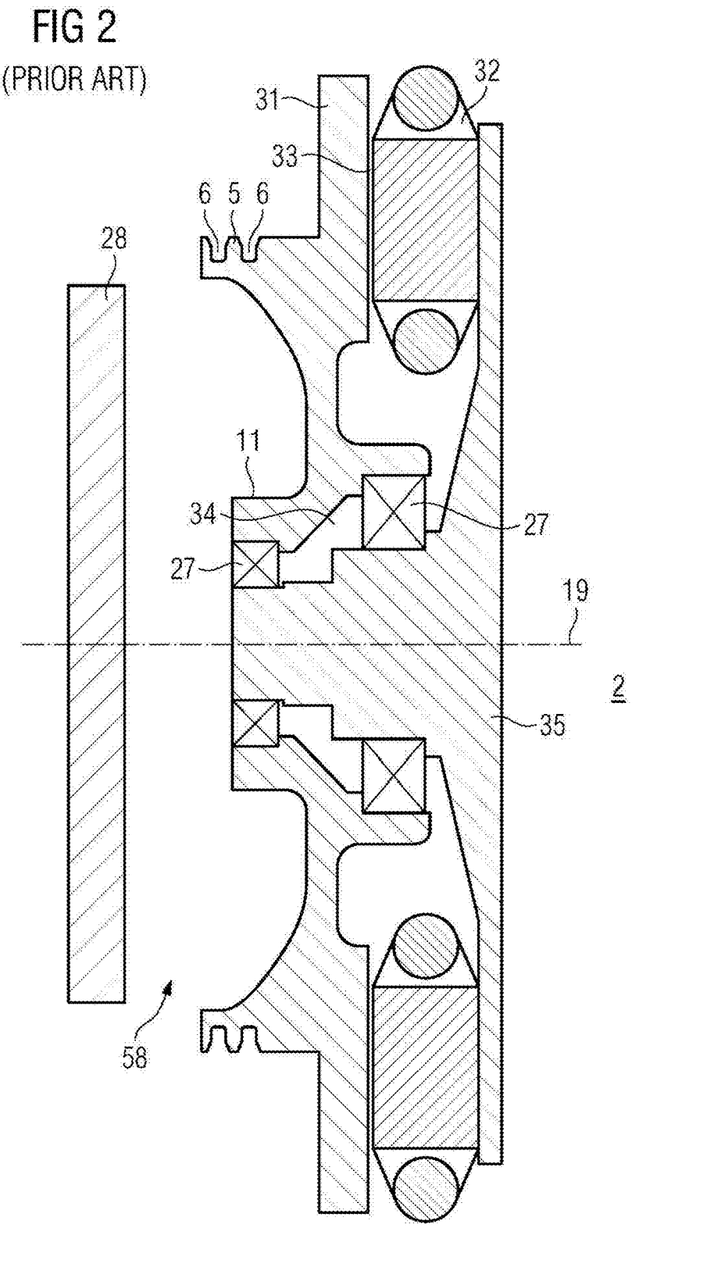
FIG. 2 illustrates the structure of an axial motor of a hoisting machine.

FIG. 1 illustrates the concept of elevator assembly 1 including a hosting machine 2, and FIG. 2 shows certain details of the structure of a hosting machine 2. FIG. 1 and the respective part of the description can also be found in international patent application published under publication number WO 2011/154 614 A1. FIG. 2 and the respective part of description can be seen in FIG. 2 of international patent application published under publication number WO 2011/036348 A1, with slight modifications in the shape of the rotor. Also the sensor arrangement has been omitted for clarity.

FIG. 1 is a block diagram an elevator assembly 1, in which the elevator car 15 and the counterweight 29 are suspended in the elevator hoistway 30 with suspension ropes 16. Elevator car 15 is movable with the hoisting machine 2 of the elevator assembly 1. The hoisting machine 2 is disposed in the top part of the elevator hoistway 30, along a guide rail 9 fixed to a wall part 17 of the elevator hoistway 30 by exerting a force effect on the elevator car 15 with suspension ropes 16 traveling via the traction sheave 5 of the hoisting machine 2. On the surface of the traction sheave 5 are rope grooves 6 (see also FIG. 2), in which the suspension ropes 16 move along with the rotational movement of the traction sheave 5 such that the suspension ropes 16 are rotatably supported in the rope grooves 6.

The power supply to the hoisting machine 2 most preferably takes place with a frequency converter (not shown in FIG. 1) connected between an electricity network and the hoisting machine 2. The frequency converter and the hoisting machine 2 are most preferably disposed in the elevator hoistway 30, in connection with wall part 28 of the elevator hoistway 30 outside the path of movement of the elevator car 15.

The hoisting machine 2 may be fixed to a guide rail 9, most preferably by using the fixing arrangement as disclosed in international patent application published under publication number WO 2011/154614 A1 in such a manner that the hoisting machine 2 is apart from the wall part 17 of the elevator hoistway 30. The guide rail 9 bears the force exerted on the rope grooves 6 of the traction sheave 5 via the suspension ropes 16. The guide rail 9 is fixed to the wall part 17 of the elevator hoistway with guide rail fixings 31.

The hoisting machine 2 of the elevator is disposed in the space between the aforementioned wall part 17 and the guide rail 9 such that the axis of rotation 19 of the hoisting machine is situated essentially orthogonally with respect to the wall part 17. Hoisting ropes 16 arriving at the rope grooves 61 of the traction sheave 5 as well as the hoisting ropes 16 leaving from the rope grooves 6 travel closer to the wall part 17 than the rear part of the guide rail 9 of the elevator car 15. WO 2011/154614 A1 discloses in more detail the fixing arrangement 7 for a hoisting machine 2 used in the elevator assembly 1. The hoisting machine 2 is fixed at its top part to the guide rail 9 from at least two points, which are at the same height and which are situated apart from each other in the width direction w of the guide rail 9 of the elevator car 15, with the fixing arrangement 7 comprising rigid fixing means 7 which continues essentially as an integral piece between the fixing points 3A, 3B. Fixing points 3A, 3B of hoisting machine 2 comprise fixing pins/fixing bolts. The fixing arrangement is fixed rigidly to guide rail 9 e.g. with fixing pins, fixing bolts or fixing screws. Hoisting machine 2 is fixed at its bottom part to guide rail 9 from only one fixing point 3C with a fixing arrangement 10. The fixing pins of the fixing points 3A, 3B of the top part of the hoisting machine 2 as well as the fixing point 3C of the bottom part are connected to the rigid fixing arrangements 7, 10 with an elastomer, which damps the vibration caused by the operation of the hoisting machine 2, e.g. from the effect of groove harmonics. The brake ring of the drum brake is formed as an extension of the rotating structure of the hoisting machine. Two drum brakes (omitted in FIG. 1) movably supported on the stationary structure of the hoisting machine 2 are the machinery brakes of the hoisting machine 2, the brake shoes of which drum brakes engage, pressed by a spring pack, against the brake ring to brake the movement of the traction sheave 5 of the hoisting machine 2. For example, in connection with an emergency stop the brake shoes of the machinery brakes engage to brake a traction sheave 5 that is moving rotationally; in this case, owing to the kinetic energy of the elevator car 15, an essentially large force braking the movement of the traction sheave is formed between the rotating structure and the stationary structure of the hoisting machine 2, which force tries to produce vibration of the hoisting machine. For damping the vibrations of the hoisting machine 2, the distance s between the fixing points 3A, 3B of the top part of the hoisting machine is selected to be equal to, or even greater than the diameter D of the traction sheave 5. The distance s between the fixing points 3A, 3B could also be selected e.g. such that the ratio of the distances to the diameter D1 of the brake ring is greater, e.g. greater than 0.5. This type of fixing arrangement stiffens the structure of the hoisting machine 2, reducing the vibration of the hoisting machine.

FIG. 2 shows a sectional drawing of hoisting machine 2. For detecting the position of a magnetic pole of the rotor 31, or for measurement of position data and/or movement, the hoisting machine 2 may—but it does not need to—comprise an optical encoder or a resolver, or a magnetic band and reader (as the hoisting machine disclosed in WO 2011/036348 A1) comprising combinations of a magnetic band and a reader.

The hoisting machine 2 in FIG. 2 is a permanent-magnet synchronous motor, in which the permanent magnets are mounted on the rotor 31. The drive sheave 5 is integrated with the rotor 31. The air gap 33 between the stator 32 and the rotor 31 is substantially parallel to the rotational axis 19 of the rotor 31. The rotor 31 and the drive sheave 5 are rotatably supported by bearings 27 on the body part of the hoisting machine 2. The bearing 27 is mounted in a bearing housing 34, which is integrated in the same body with the traction sheave 5.

The traction sheave 5 protection plate 28 secured to the body part 35 of the hoisting machine 2 extends to the side of the traction sheave 5 so that the traction sheave 5 is housed in the space remaining between the protection plate 28 and the body part 33.

Figure 3:
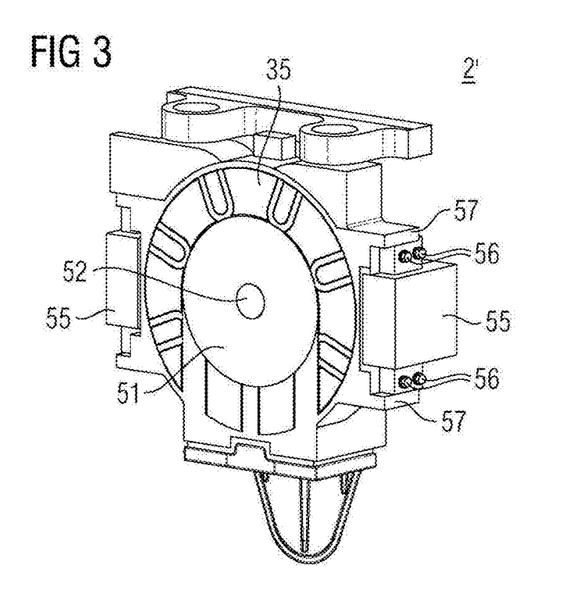
FIG. 3 illustrates the hoisting machine according to the first aspect of the invention as seen in perspective from the stator side.
Figure 4:
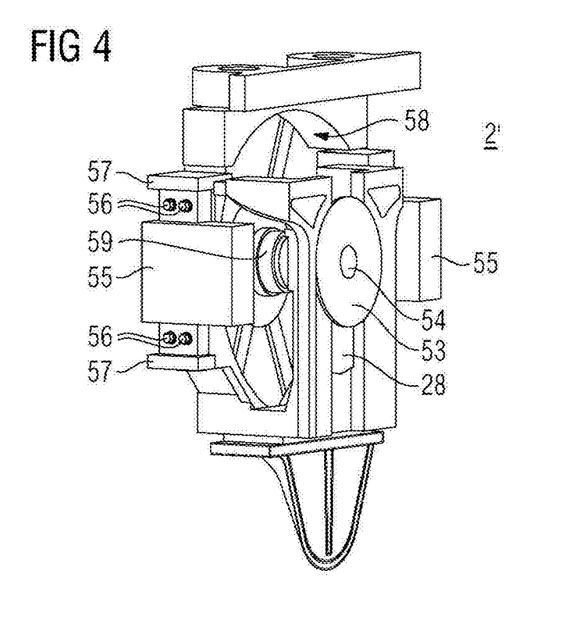
FIG. 4 illustrates the hoisting machine of FIG. 3 as seen in perspective from the rotor side (rotor omitted)

FIG. 3 illustrates a hoisting machine 2' according to the invention as seen in perspective from the stator 32 side. FIG. 4 illustrates the hoisting machine 2' as seen in perspective from the rotor 31 side.

Figure 5:
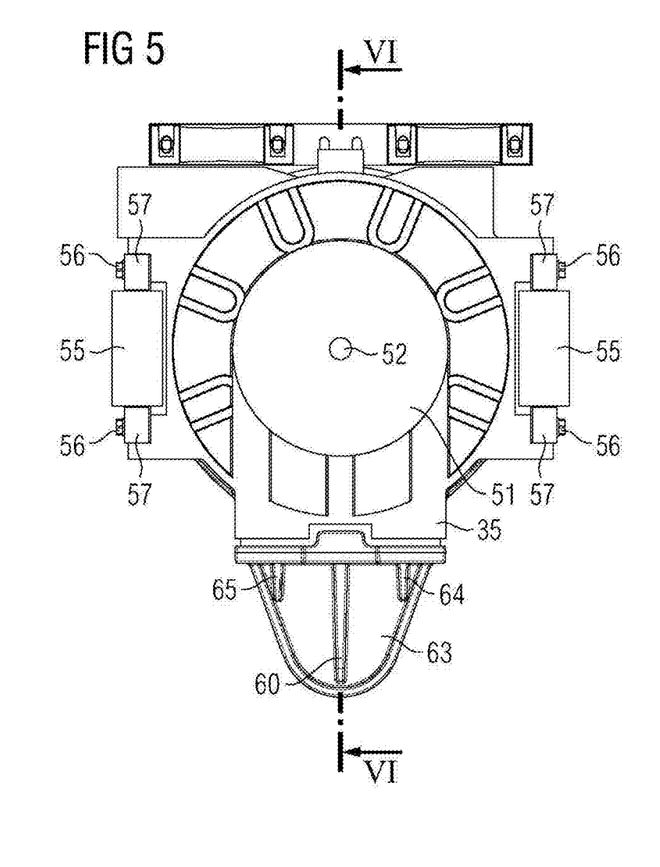
FIG. 5 is front view of the hoisting machine of FIG. 3.
Figure 6:
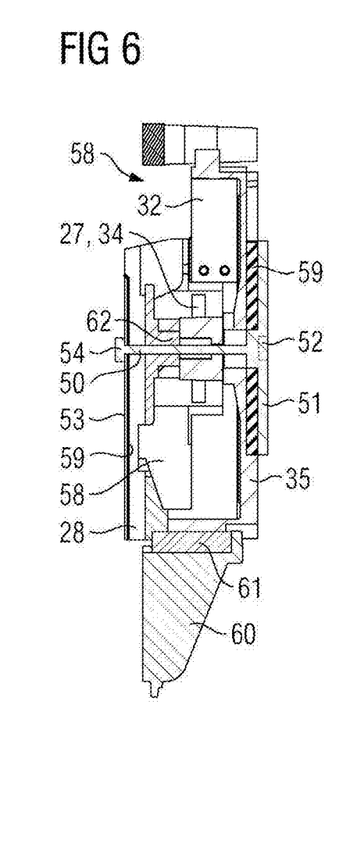
FIG. 6 is the section VI-VI of the hoisting machine of FIG. 3 as illustrated in FIG. 5.
Figure 7:
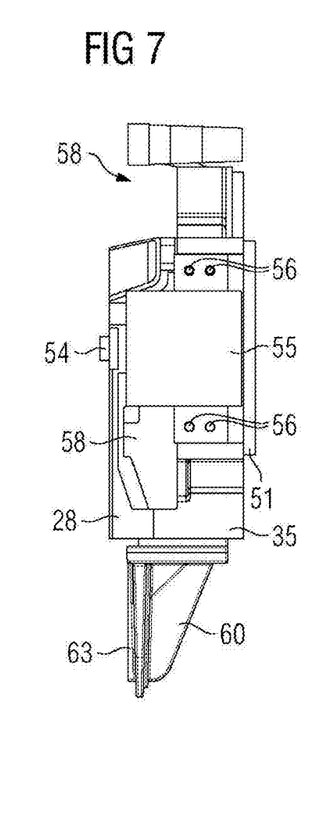
FIG. 7 is the right-hand side view of the hoisting machine of FIG. 3 as illustrated in FIG. 5.

FIG. 5 is a top view of the hoisting machine 2' and FIG. 6 is the section VI-VI. The hoisting machine 2' is shown in right-hand side in FIG. 7.

It should be understood that rotor 31 has been omitted from FIGS. 3-7 for the sake of clarity.

The hoisting machine 2' comprises an axial flux motor comprising a rotor 31 having rope grooves 6 and arranged in rotor compartment 58 between a body part 35 and a protection plate 28, and a stator 32 arranged against the rotor 31 in such a manner that the rotor 31 is separated by the stator 32 by an air gap.

Body part 35 serves as a fixing for the stator 32 that most preferably is welded to the body part 35. Alternatively of welding or in addition to it, also the fixing arrangement described in WO 2010/063869 A1 can be used to fix the stator to the body part.

The hoisting machine 2' further comprises at least one rail fixing arrangement 60 for fixing the hoisting machine 2' to guide rail 9. The rail fixing arrangement 60 is most probably integral to the base part 35 and contains suitable protruding lips that can be mounted around the guide rail 9, and also stiffening wing 63 and stiffening ribs 64 to increase the mechanical rigidity of the hoisting machine 2'.

Furthermore, the hoisting machine 2' comprises lateral brake shoes 55 movably attached to brake shoulders 57 that are attached to the base part 35 in a form-locking manner, such as by using bolts 56. Brake shoes 55 are used to brake the movement of the rotor 31. They Additionally, the hoisting machine 2' comprises braking control system that ensures that the brake shoes 55 are normally in the locking position i.e. engage with the rotor 31, and disengage from the rotor only when the braking control system is activated.

The hoisting machine 2' further comprising a first cover plate 51 and a second cover plate 53, arranged at opposite sides of the hoisting machine 2', and both being equipped with a damper 59. Preferably, the first cover plate 51 and the second cover plate 53 that both serve as carrier for the respective damper 59 are made of iron, or comprise iron, 10. The damper 59 is a layer of elastic material, such as rubber or elastomer. The first cover plate 51 and the second cover plate 53 form an external damper to the axial flux motor.

The tightness between the first cover plate 51 and the second cover plate 53 is adjustable.

The first cover plate 51 can be located on the body part 35 or, as can be seen in FIG. 6, in a recess in the body part 35. Respectively, the second cover plate 53 can be located on the protection plate 28 or as also can be seen in FIG. 6, in a recess in the protection plate 28.

The first cover plate 51 and the second cover plate 53 are interconnected through a tightness adjustment mechanism that comprises a bolt 50 (with bolt head 54) and a nut 52. The tightness adjustment mechanism penetrates the rotor 31 and the stator 32. Instead of bolt 50 and nut 52, the tightness adjustment mechanism can be realized by using any other suitable form-locking arrangement.

The bolt head 54 and the nut 52 are so arranged that they are at opposite sides of respective cover plate 51, 53 than the dampers 59 so that the dampers 59 are tightenable or loosenable by rotating the bolt head 54 and/or the nut 52.

Figure 8:
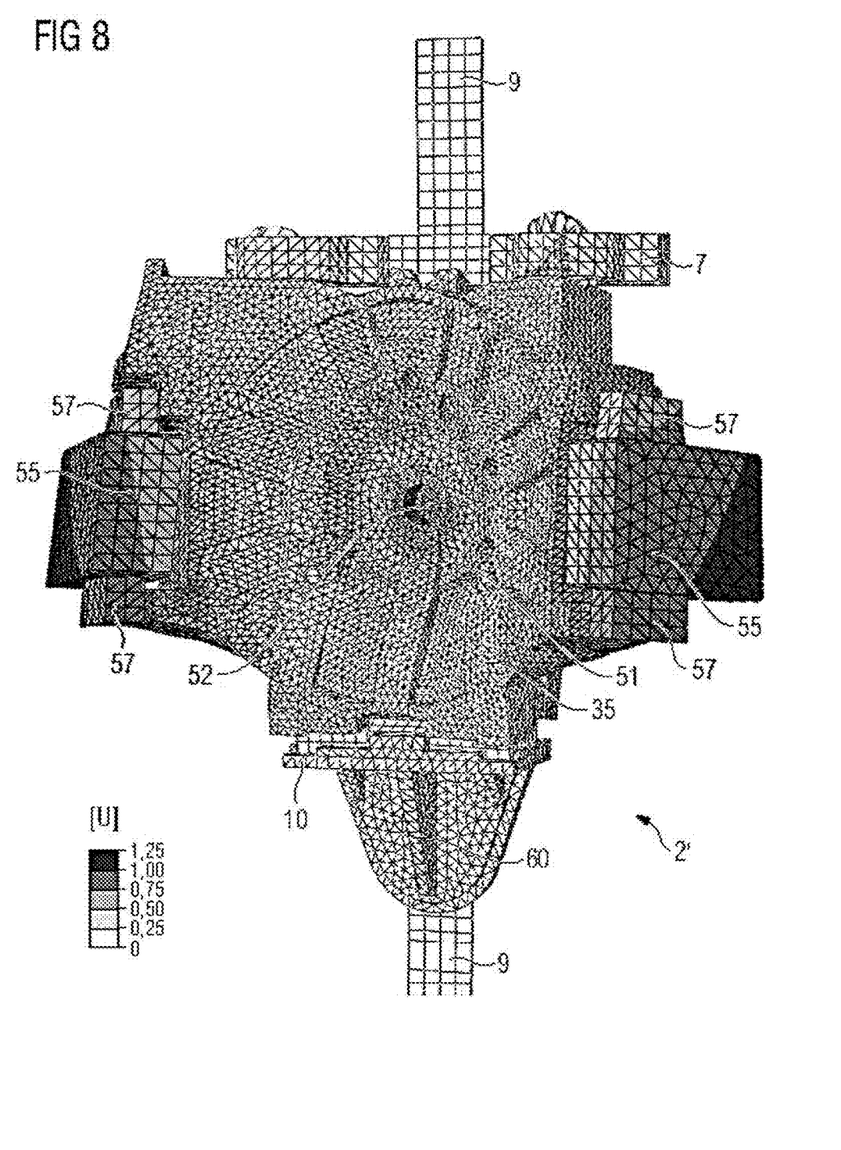
FIG. 8 show the results of a noise simulation computed for the hoisting machine assembled on the guide rail of an elevator assembly and fixed to the wall part of the elevator hoistway with fixing arrangements.

In the simulations carried out by the inventor, around the cover plates 51, 53 vibration amplitudes $|U|<0.25$ (in arbitrary units) could be obtained (ref. FIG. 8). Vibration amplitudes generally depend on load, speed and certain other factors and in general are described as mobility (displacement/force). As can be seen, at noisiest $(0.5<|U|<1.25)$ the hoisting machine 2' is around brakes. A respective simulation carried out by the inventor for hoisting machine 2 shows that vibration amplitudes $0.5<|U|<1.25$ were present all over the hoisting machine 2. The hoisting machines 2' and 2 compared with each other, it can readily be seen that the hoisting machine 2' according to the invention is from noise/vibration viewpoint superior to a hoisting machine 2 known from background art.

The invention is not to be understood to be limited in the attached patent claims but must be understood to encompass all their legal equivalents.

LIST OF REFERENCE NUMERALS USED 1 elevator assembly
2, 2' hoisting machine
3A, 3B, 3C fixing point
5 traction sheave
6 rope grooves
7 fixing arrangement
9 guide rail
10 fixing arrangement
15 elevator car
16 suspension ropes
17 wall part of the elevator hoistway
27 bearing
28 protection plate
29 counterweight
30 elevator hoistway
31 rotor
32 stator
33 air gap
34 bearing housing
35 body part
50 bolt
51 cover plate
52 nut
53 cover plate
54 bolt head
55 brake shoe
56 bolt
57 brake shoulder
58 rotor compartment
59 damper
60 rail fixing arrangement
61 damper
62 bearing housing
63 stiffening wing
64 stiffening rib

The invention claimed is:

1. A hoisting machine, comprising:
an axial flux motor comprising a rotor having rope grooves and arranged in a rotor compartment between a body part and a protection plate;
a stator arranged against the rotor and the rotor is spaced by the stator by an air gap; and
a first cover plate and a second cover plate, arranged at opposite sides of the hoisting machine, and both the first and second cover plates being equipped with a damper,
wherein a connection between the first cover plate and the second cover plate is adjustable.

2. The hoisting machine according to claim 1, wherein the first cover plate is located on the body part or in a recess in the body part.

3. The hoisting machine according to claim 2, wherein the first cover plate and the second cover plate are interconnected through a tightness adjusting mechanism.

4. The hoisting machine according to claim 2, wherein the first cover plate and the second cover plate form an external damper.

5. The hoisting machine according to claim 1, wherein the second cover plate is located on the protection plate.

6. The hoisting machine according to claim 5, wherein the first cover plate and the second cover plate are interconnected through a tightness adjusting mechanism.

7. The hoisting machine according to claim 5, wherein the first cover plate and the second cover plate form an external damper.

8. The hoisting machine according to claim 1, wherein the first cover plate and the second cover plate are connected through a tightness adjusting mechanism.

9. The hoisting machine according to claim 8, wherein the tightness adjusting mechanism penetrates the rotor and the stator.

10. The hoisting machine according to claim 9, wherein the tightness adjusting mechanism includes at least one form-locking arrangement.

11. The hoisting machine according to claim 8, wherein the tightness adjusting mechanism includes at least one form-locking arrangement.

12. The hoisting machine according to claim 11, wherein the form-locking arrangement comprises a bolt and a nut and wherein the bolt has a bolt head, and wherein the bolt head and the nut are so arranged that they are on a side of a respective cover plate opposite from a respective damper so that the dampers are tightenable or loosenable by rotating the bolt head and/or the nut.

13. The hoisting machine according to claim 8, wherein the first cover plate and the second cover plate form an external damper.

14. The hoisting machine according to claim 1, wherein the first cover plate and the second cover plate form an external damper.

15. The hoisting machine according to claim 1, wherein the first cover plate and the second cover plate serve as a carrier for a respective damper and are made of iron, or comprise iron.

16. The hoisting machine according to claim 1, wherein the damper is a layer of elastic material, or comprises at least one layer of elastic material.

17. The hoisting machine according to claim 1, wherein the hoisting machine further comprises at least one rail fixing arrangement for fixing the hoisting machine to a guide rail.

18. An elevator assembly, comprising:
 an elevator car movable in an elevator hoistway by rotation of a drive sheave of the hoisting machine according to claim 1 causing movement of suspension ropes in rope grooves.

19. The elevator assembly according to claim 18, wherein the damper is a layer of elastic material, or comprises at least one layer of elastic material, and wherein:
 the elevator car is movable along one, two or more guide rails in the elevator hoistway; and
 the hoisting machine has been installed between a wall part of the elevator hoistway and the guide rail in such a manner that suspension ropes of the elevator assembly are operable by the rotor via rope grooves and the suspension ropes are located between the hoisting machine and the movable elevator car.

20. A method of damping vibration of the hoisting machine according to claim 1, wherein the hoisting machine is installed in an elevator assembly comprising an elevator car movable in an elevator hoistway, the method comprising the step of:
 adjusting tightness between the first cover plate and the second cover plate of the hoisting machine to modify the operating noise caused by operation of the hoisting machine.

* * * * *